(12) United States Patent
Landa et al.

(10) Patent No.: US 7,037,869 B2
(45) Date of Patent: *May 2, 2006

(54) CLEAR GLASS COMPOSITION

(75) Inventors: Leonid Landa, Grosse Ile, MI (US); Ksenia A. Landa, Grosse Ile, MI (US); Scott V. Thomsen, Milford, MI (US); Richard Hulme, Rochester Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/785,716

(22) Filed: Feb. 25, 2004

(65) Prior Publication Data

US 2004/0209757 A1  Oct. 21, 2004

Related U.S. Application Data

(60) Continuation-in-part of application No. 10/457,552, filed on Jun. 10, 2003, now Pat. No. 6,949,484, which is a division of application No. 10/056,051, filed on Jan. 28, 2002, now Pat. No. 6,610,622.

(51) Int. Cl.
*C03C 3/095* (2006.01)

(52) U.S. Cl. ..................................... 501/64
(58) Field of Classification Search ................. 501/64, 501/70, 71
See application file for complete search history.

(56) References Cited

U.S. PATENT DOCUMENTS

| | | | |
|---|---|---|---|
| 3,663,474 A | 5/1972 | Lee et al. |
| 4,792,536 A | 12/1988 | Pecoraro et al. |
| 5,023,210 A | 6/1991 | Krumwiede et al. |
| 5,030,594 A | 7/1991 | Heithoff |
| 5,190,896 A | 3/1993 | Pucilowski et al. |
| 5,214,008 A | 5/1993 | Beckwith et al. |
| 5,240,886 A | 8/1993 | Gulotta et al. |
| 5,264,400 A | 11/1993 | Nakaguchi et al. |
| 5,346,768 A | 9/1994 | Winter et al. |
| 5,346,864 A | 9/1994 | Maugendre et al. |
| 5,385,872 A | 1/1995 | Gulotta et al. |
| 5,393,593 A | 2/1995 | Gulotta et al. |
| 5,446,007 A | 8/1995 | Krashkevich et al. |
| 5,558,942 A | 9/1996 | Itoh et al. |
| 5,569,630 A | 10/1996 | Landa et al. |
| 5,656,559 A | 8/1997 | Combes et al. |
| 5,700,579 A | 12/1997 | Jeanvoine et al. |
| 5,932,502 A | 8/1999 | Longobardo et al. |
| 6,218,323 B1 | 4/2001 | Bretschneider et al. |
| 6,235,666 B1 | 5/2001 | Cochran et al. |
| 6,335,299 B1 | 1/2002 | Foguenne et al. |
| 6,376,403 B1 | 4/2002 | Koyama et al. |
| 6,395,659 B1 | 5/2002 | Seto et al. |
| 6,403,509 B1 | 6/2002 | Cochran et al. |
| 6,407,021 B1 | 6/2002 | Kitayama et al. |
| 6,461,736 B1 | 10/2002 | Nagashima et al. |
| 6,498,118 B1 | 12/2002 | Landa et al. |
| 6,521,558 B1 | 2/2003 | Landa et al. |
| 6,548,434 B1 | 4/2003 | Nagashima |
| 6,573,207 B1 | 6/2003 | Landa et al. |
| 6,610,622 B1 | 8/2003 | Landa et al. |
| 6,711,917 B1 | 3/2004 | Landa et al. |
| 6,716,780 B1 | 4/2004 | Landa et al. |
| 6,927,186 B1 | 8/2005 | Hulme et al. |
| 2001/0006927 A1 | 7/2001 | Cochran et al. |
| 2002/0049128 A1 | 4/2002 | Koyama et al. |
| 2002/0058579 A1 | 5/2002 | Seto et al. |
| 2003/0144126 A1 | 7/2003 | Kitayama et al. |
| 2003/0199384 A1 | 10/2003 | Landa et al. |
| 2003/0216241 A1 | 11/2003 | Landa et al. |
| 2004/0116271 A1 | 6/2004 | Thomsen et al. |
| 2004/0121896 A1 | 6/2004 | Landa et al. |
| 2004/0180775 A1 | 9/2004 | Landa et al. |
| 2005/0188725 A1 | 9/2005 | Tullman et al. |

FOREIGN PATENT DOCUMENTS

| | | |
|---|---|---|
| EP | 1 116 699 | 7/2001 |
| EP | 1 201 615 | 5/2002 |
| EP | 1 281 687 | 2/2003 |
| EP | 1 291 330 | 3/2003 |
| JP | 07-109147 | 4/1995 |
| JP | 40710914 | 4/1995 |
| JP | 11-60269 | 3/1999 |
| WO | WO 95/13993 | 5/1995 |
| WO | WO 02/081395 | 10/2002 |
| WO | WO 03/064342 | 8/2003 |

OTHER PUBLICATIONS

U.S. Appl. No. 10/457,552 filed Jun. 10, 2003.
"Ultraviolet-Absorbing Colorless Transparent Glass", Hidetoshi, JP11060269, vol. 1999, No. 88.

*Primary Examiner*—Karl Group
(74) *Attorney, Agent, or Firm*—Nixon & Vanderhye P.C.

(57) ABSTRACT

Glass is provided so as to have high visible transmission and/or fairly clear or neutral color. In certain example embodiments, the glass may include a base glass (e.g., soda lime silica base glass) and, in addition, by weight percentage:

| | |
|---|---|
| total iron (expressed as $Fe_2O_3$): | 0.01 to 0.30% |
| erbium oxide (e.g., $Er_2O_3$): | 0.01 to 0.30%. |

37 Claims, No Drawings

CLEAR GLASS COMPOSITION

This application is a continuation-in-part (CIP) of U.S. patent application Ser. No. 10/457,552, filed Jun. 10, 2003 now U.S. Pat. No. 6,949,484, which is a divisional of U.S. Ser. No. 10/056,051, filed Jan. 28, 2002 (now U.S. Pat. No. 6,610,622), the disclosures of which are hereby incorporated herein by reference.

This invention relates to glass compositions and methods of making the same. More particularly, this invention relates to glass having high light transmittance in the visible range and/or fairly neutral color. Such glass compositions are thus useful, for example, in architectural windows, patterned glass applications, solar cells, and/or automotive windows.

BACKGROUND OF THE INVENTION

Glass that is fairly clear in color and highly transmissive to visible light (e.g., at least 75% transmissive, or even more preferably at least 80% transmissive) is sometimes desirable. One way of achieving such as glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits.

As can be appreciated from the above, glass raw materials (e.g., silica, soda ash, dolomite, and/or limestone) typically include certain impurities such as iron. The total amount of iron present is expressed herein in terms of $Fe_2O_3$ in accordance with standard practice. However, typically, not all iron is in the from of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. While iron in the ferric state ($Fe^{3+}$) is also a colorant, it is of less concern when seeking to achieve a glass fairly clear in color since iron in the ferric state tends to be weaker as a colorant than its ferrous state counterpart.

In view of the above, it is apparent that there exists a need in the art for a new glass composition which allows a glass to have fairly clear color and/or high visible transmission, without having to resort to extremely pure (i.e., free of iron) glass raw materials.

SUMMARY OF EXAMPLE EMBODIMENTS OF INVENTION

An object of this invention is to provide a glass that has fairly clear color and/or high visible transmission.

In certain example embodiments of this invention, a glass having a visible transmission of at least 75% (more preferably at least 80%, even more preferably at least 85%, and most preferably at least about 90%) is provided, wherein in making the glass a batch therefor includes a base glass (e.g., soda lime silica glass) and in addition comprises (or consists essentially of in certain other embodiments), by weight percentage:

| | |
|---|---|
| total iron (expressed as $Fe_2O_3$): | 0.01 to 0.30% |
| erbium oxide (e.g., $Er_2O_3$): | 0.01 to 0.30% |
| cerium oxide (e.g., $CeO_2$): | 0.005 to 0.30%. |

While cerium oxide is preferred in many embodiments, its presence is not a requirement.

In certain other example embodiments of this invention there is provided a glass comprising:

| Ingredient | wt. % |
|---|---|
| $SiO_2$ | 67–75% |
| $Na_2O$ | 10–20% |
| CaO | 5–15% |
| total iron (expressed as $Fe_2O_3$) | 0.01 to 0.30% |
| erbium oxide | 0.01 to 0.30% | wherein the glass has visible transmission of at least 75%, and at least one of a transmissive a* color value of −1.0 to +1.0 and a transmissive b* color value of −1.0 to +1.5.

Certain example embodiments of the invention fulfill one or more of the above-listed objects and/or needs by providing a method of making glass, the method comprising:

providing a glass batch comprising:

| Ingredient | wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| total iron (expressed as $Fe_2O_3$) | 0.01 to 0.30% |
| erbium oxide | 0.01 to 0.30% |
| cerium oxide and/or a nitrate | 0 to 2.0% | melting the batch and forming a resulting glass that has visible transmission of at least 75%, a transmissive a* color value of −1.0 to +1.0, and a transmissive b* color value of −1.0 to +1.5.

Certain other example embodiments of this invention fulfill one or more of the above-listed objects and/or needs by providing a glass comprising:

| | |
|---|---|
| total iron (expressed as $Fe_2O_3$) | 0.01 to 0.30% |
| erbium oxide | 0.01 to 0.30% |
| cerium oxide | 0 to 0.30%. |

Certain other example embodiments of this invention fulfill one or more of the above-listed objects and/or needs by providing a method of making glass, the method comprising providing a glass batch comprising:

| | |
|---|---|
| total iron (expressed as $Fe_2O_3$): | 0.01 to 0.30% |
| erbium oxide: | 0.01 to 0.30% |
| cerium oxide and/or a nitrate: | 0 to 2.0%, and |
| using the glass batch to make glass. | |

Certain other example embodiment of this invention fulfill one or more of the above-listed objects and/or needs by providing a glass comprising:

| | |
|---|---|
| total iron (expressed as $Fe_2O_3$) | 0.01 to 0.30%, and |
| erbium oxide | 0.01 to 0.30%. |

DETAILED DESCRIPTION OF CERTAIN EMBODIMENTS OF THIS INVENTION

Glasses according to different embodiments of this invention may be used, for example, in the automotive industry (e.g., windshields, backlites, side windows, etc.), in architectural window applications, for patterned glass applications, solar cell applications, and/or in other suitable applications.

Certain glasses according to example embodiments of this invention utilize soda-lime-silica flat glass as their base composition/glass. In addition to base composition/glass, a unique colorant portion is provided in order to achieve a glass that is fairly clear in color and/or has a high visible transmission. An exemplary soda-lime-silica base glass according to certain embodiments of this invention, on a weight percentage basis, includes the following basic ingredients:

TABLE 1

EXAMPLE BASE GLASS

| Ingredient | Wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% |

Other minor ingredients, including various conventional refining aids, such as $SO_3$, carbon, and the like may also be included in the base glass. In certain embodiments, for example, glass herein may be made from batch raw materials silica sand, soda ash, dolomite, limestone, with the use of salt cake ($SO_3$) and/or Epsom salts (e.g., about a 1:1 combination of both) as refining agents. Preferably, soda-lime-silica based glasses herein include by weight from about 10–15% $Na_2O$ and from about 6–12% CaO.

In addition to the base glass (e.g., see Table 1 above), in making glass according to certain example embodiments of the instant invention the glass batch includes materials (including colorants and/or oxidizers) which cause the resulting glass to be fairly neutral in color and/or have a high visible light transmission. These materials may either be present in the raw materials (e.g., small amounts of iron), or may be added to the base glass materials in the batch (e.g., erbium, and/or the like). In certain example embodiments of this invention, the resulting glass has visible transmission of at least 75%, more preferably at least 80%, even more preferably at least 85%, and most preferably of at least about 90%. In certain example non-limiting instances, such high transmissions may be achieved at a reference thickness of about 5.6 mm, or alternatively at a reference thickness of about 6 mm. In certain example instances, the glass may even have a visible transmission of at least 90.5% at such reference thicknesses.

In certain embodiments of this invention, in addition to the base glass, the glass batch comprises or consists essentially of materials as set forth in Table 2 below (in terms of weight percentage of the total glass composition):

TABLE 2

EXAMPLE GLASS BATCH OF FIRST EMBODIMENT

| Ingredient | General (Wt. %) | More Preferred | Most Preferred |
|---|---|---|---|
| total iron (expressed as $Fe_2O_3$): | 0.01–0.30% | 0.02–0.20% | 0.03–0.15% |
| erbium oxide (e.g., $Er_2O_3$): | 0.01–0.30% | 0.02–0.20% | 0.03–0.13% |
| cerium oxide (e.g., $CeO_2$): | 0–0.30% | 0.01–0.18% | 0.03–0.12% |

The batch is melted and glass formed using the known float process. Optionally, in certain example embodiments of the invention, neodymium oxide (e.g., $Nd_2O_3$) may be added to the batch, as exemplified below in Table 3 according to a second example embodiment of this invention (the material listed in Table 3 are in addition to the base glass described above).

TABLE 3

EXAMPLE GLASS BATCH OF SECOND EMBODIMENT

| Ingredient | General (Wt. %) | More Preferred | Most Preferred |
|---|---|---|---|
| total iron (expressed as $Fe_2O_3$): | 0.01–0.30% | 0.02–0.20% | 0.03–0.15% |
| erbium oxide (e.g., $Er_2O_3$): | 0.01–0.30% | 0.02–0.20% | 0.03–0.13% |
| cerium oxide (e.g., $CeO_2$): | 0–0.30% | 0.01–0.18% | 0.03–0.12% |
| neodymium oxide (e.g., $Nd_2O_3$): | 0.005–0.15% | 0.010–0.050% | 0.010–0.030% |

In certain embodiments of this invention (e.g., first and/or second embodiments above), the colorant portion is substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. It is noted that while the presence of cerium oxide is preferred in many embodiments of this invention, it is not required in all embodiments and indeed is intentionally omitted in many instances.

In other embodiments of this invention, cerium oxide (e.g., $CeO_2$) may be either replaced or supplemented by $NaNO_3$ in the glass batch; see the third, fourth and fifth embodiments below (the batch materials in Tables 4–6 below are in addition to the base glass raw materials described above).

TABLE 4

EXAMPLE GLASS BATCH OF THIRD EMBODIMENT

| Ingredient | General (Wt. %) | More Preferred | Most Preferred |
|---|---|---|---|
| total iron (expressed as $Fe_2O_3$): | 0.01–0.30% | 0.02–0.20% | 0.03–0.15% |

TABLE 4-continued

EXAMPLE GLASS BATCH OF THIRD EMBODIMENT

| Ingredient | General (Wt. %) | More Preferred | Most Preferred |
|---|---|---|---|
| erbium oxide (e.g., $Er_2O_3$): | 0.01–0.30% | 0.02–0.20% | 0.03–0.13% |
| sodium nitrate ($NaNO_3$): | 0–2.0% | 0.1–2.0% | 0.3–1.2% |

TABLE 5

EXAMPLE GLASS BATCH OF FOURTH EMBODIMENT

| Ingredient | General (Wt. %) | More Preferred | Most Preferred |
|---|---|---|---|
| total iron (expressed as $Fe_2O_3$): | 0.01–0.30% | 0.02–0.20% | 0.03–0.15% |
| erbium oxide (e.g., $Er_2O_3$): | 0.01–0.30% | 0.02–0.20% | 0.03–0.13% |
| sodium nitrate ($NaNO_3$): | 0–2.0% | 0.2–1.5% | 0.3–1.2% |
| neodymium oxide (e.g., $Nd_2O_3$): | 0–0.15% | 0.010–0.050% | 0.010–0.030% |

TABLE 6

EXAMPLE GLASS BATCH OF FIFTH EMBODIMENT

| Ingredient | General (Wt. %) | More Preferred | Most Preferred |
|---|---|---|---|
| total iron (expressed as $Fe_2O_3$): | 0.01–0.30% | 0.02–0.20% | 0.03–0.15% |
| erbium oxide (e.g., $Er_2O_3$): | 0.01–0.30% | 0.02–0.20% | 0.03–0.13% |
| cerium oxide (e.g., $CeO_2$): | 0–0.30% | 0–0.18% | 0–0.12% |
| sodium nitrate ($NaNO_3$): | 0–2.0% | 0.2–1.5% | 0.3–1.2% |

In the fifth embodiment (see Table 6 above), cerium oxide (e.g., $CeO_2$) and sodium nitrate ($NaNO_3$) may be combined as oxidizers, so as to cause the effects of equations (1) and (2) below, or alternatively both may be omitted. However, in certain example instances, one or both of cerium oxide and/or sodium nitrate may be provided in this fifth embodiment.

It is noted that in certain example embodiments herein, the amount of total iron may even be less than 0.10%.

The above batches are melted and the float process used to form glass (e.g., soda lime silica glass) in a known manner.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

In order to compensate for the color caused by the ferric iron resulting from the optional addition of the cerium oxide and/or sodium nitrate, it has been found that adding erbium oxide (e.g., $Er_2O_3$ or any other suitable stoichiometric form) [and/or neodymium oxide (e.g., $Nd_2O_3$ of any other suitable stoichiometric form) in certain example instances] causes the color of the resulting glass to become more clear (i.e., more neutral as the a* and/or b* color value(s) move(s) toward neutral 0). Erbium oxide acts as a pink colorant. In particular, erbium oxide apparently acts to physically compensate for the iron color, thereby making the color of the glass more neutral which is desirable in certain embodiments of this invention, while allowing the glass to still have high visible transmission. In particular, it has been found that the use of such erbium oxide in the glass allows a high transmission and fairly neutral colored glass to be achieved without having to completely eliminate iron from the glass.

According to certain example embodiments of this invention, the optional presence of cerium oxide (e.g., $CeO_2$) as an oxidizer in the glass batch acts as a chemical decolorizer since during melting of the glass batch it causes iron in the ferrous state ($Fe^{2+}$; FeO) to oxidize to the ferric state ($Fe^{3+}$) as illustrated by the following equation:

$$Fe^{2+}+Ce^{4+}=Fe^{3+}+Ce^{3+} \tag{1}$$

Equation (1) shows that the presence of cerium oxide in the glass batch causes an amount of the strong blue-green colorant of ferrous iron ($Fe^{2+}$; FeO) to oxidize into the weaker yellow-green ferric iron colorant ($Fe^{3+}$) during the glass melt (note: some ferrous state iron will usually remain in the resulting glass, as potentially may some $Ce^{4+}$). Accordingly, a significant portion of the $CeO_2$ added to the original glass batch prior to the melt is transformed during the melt into $Ce_2O_3$ which is present in the resulting glass. The aforesaid oxidation of the iron tends to reduce coloration of the glass, and does not significantly decrease visible light transmission of the resulting glass (in certain instances, this may even causes visible transmission to increase). However, those of skill in the art will appreciate that there still exists significant coloration in the glass due to the ferric iron if only the iron and cerium oxide are provided. In other words, it has been found that adding cerium oxide to only iron containing glass is not sufficient to achieve a desired fairly clear or neutral color.

It is noted that, like $Fe_2O_3$, the phrase "cerium oxide" as used herein refers to total cerium oxide (i.e., including cerium oxide in both the $Ce^{4+}$ and $Ce^{3+}$ states).

As mentioned above, the optional cerium oxide may be replaced by, or supplemented with, sodium nitrate in certain example embodiments of this invention. In embodiments where sodium nitrate ($NaNO_3$) is provided in the glass (e.g., see Tables 3–5 above), it functions in a manner similar to cerium oxide as shown in the below equation (but note the potential for oxygen bubbles). In particular, like cerium oxide, sodium nitrate can be added to the glass batch as an oxidizer to cause an amount of the strong blue-green colorant of ferrous iron ($Fe^{2+}$; FeO) to oxidize into the weaker yellow-green ferric iron colorant ($Fe^{3+}$) during the glass melt (note: some ferrous state iron will usually remain in the resulting glass):

$$Fe^{2+}+NO_3=Fe^{3+}+NO_2+\tfrac{1}{2}O_2 \tag{2}$$

Those skilled in the art will recognize that the most of the nitrate (e.g., sodium nitrate) added to the glass batch decomposes during the melt so that some burns off as $NO_x$ while other parts of it end up in the glass as $Na_2O$. While sodium nitrate ($NaNO_3$) may be utilized as an oxidizer in Tables 4–6 above, the instant invention is not so limited. For example, other nitrates (e.g., potassium nitrate $KNO_3$, or any other suitable nitrate) may be used instead of or in addition to sodium nitrate in alternative embodiments of this invention.

It will be appreciated by those skilled in the art that the optional addition of cerium oxide and/or sodium nitrate (see equations (1) and (2) above) results in a glass with a lower "redox" value (i.e., less iron in the ferrous state FeO). In this regard, the proportion of the total iron in the ferrous state (FeO) is used to determine the redox state of the glass, and redox is expressed as the ratio $FeO/Fe_2O_3$, which is the weight percentage (%) of iron in the ferrous state (FeO) divided by the weight percentage (%) of total iron (expressed as $Fe_2O_3$) in the resulting glass. Due to at least the presence of the cerium oxide and/or sodium nitrate, the redox of glass according to certain example embodiments of this invention is rather low; in particular, glass according to certain example embodiments of this invention may have a redox value (i.e., $FeO/Fe_2O_3$) of less than or equal to 0.25, more preferably less than or equal to 0.20; even more preferably less than or equal to 0.15, and most preferably less than or equal to 0.13. In some example instances, the redox may even be less than or equal to about 0.10, or even less than or equal to about 0.08. In certain example embodiments, glasses may have a redox value of from 0.10 to 0.20.

Moreover, resulting glass according to certain example embodiments of this invention may include iron in the ferrous state (FeO) in an amount (wt. %) of less than or equal to 0.020%, more preferably less than or equal to 0.015%, and most preferably less than or equal to 0.011%. In certain example embodiments, % FeO may be from about 0 to 0.02%, more preferably from about 0.0015 to 0.015%, even more preferably from about 0.0015 to 0.012%.

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In view of the above, glasses according to certain example embodiments of this invention achieve a neutral or substantially clear color and/or high visible transmission. In certain embodiments, resulting glasses according to certain example embodiments of this invention may be characterized by one or more of the following transmissive optical or color characteristics when measured at a thickness of from about 1 mm–6 mm (most preferably a thickness of about 0.219 inches (5.6 mm); this is a non-limiting thickness used for purposes of reference only) (Lta is visible transmission %):

TABLE 7

CHARACTERISTICS OF CERTAIN EXAMPLE EMBODIMENTS

| Characteristic | General | More Preferred | Most Preferred |
| --- | --- | --- | --- |
| Lta (Ill. C, 2 deg.): | >=75% | >=80% | >=85% |
| % UV (Ill. C. 2 deg.): | <=85% | <=80% | <=75% |
| % TS (Ill. C. 2 deg.): | <=90% | <=87% | <=85% |
| % FeO (wt. %): | <=0.020% | <=0.015% | <=0.011% |

TABLE 7-continued

CHARACTERISTICS OF CERTAIN EXAMPLE EMBODIMENTS

| Characteristic | General | More Preferred | Most Preferred |
| --- | --- | --- | --- |
| L* (Ill. D65, 10 deg.): | 90–100 | n/a | n/a |
| a* (Ill. D65, 10 deg.): | −1.0 to +1.0 | −0.60 to +0.60 | −0.30 to +0.50 |
| b* (Ill. D65, 10 deg.): | −1.0 to +1.5 | −0.70 to +1.0 | −0.30 to +0.40 |

As can be seen from Table 7 above, glasses of certain embodiments of this invention achieve desired features of fairly clear color and/or high visible transmission, while not requiring iron to be eliminated from the glass composition. This may be achieved through the provision of the unique material combinations described herein. The visible transmission of the glass may even be at least 90% in certain example embodiments, and even at least 90.5% in certain example instances. These visible transmission values (see above) may in certain example instances be achieved at reference thicknesses of about 5.6 mm and/or 6 mm.

EXAMPLES 1–11

Example glasses of this invention may be made from batch ingredients using well known glass melting and refining techniques. The following approximate base glass batch was used for Examples 1–8 herein (note: the below-listed ingredients in the batch will add up to 100% by weight once oxides thereof are accounted for; thus, they need not add up to one hundred as raw materials):

| Batch Ingredient for Base Glass | Parts by Wt. |
| --- | --- |
| sand | 71.5 |
| soda ash | 23.7 |
| dolomite | 18.32 |
| limestone | 6.1 |
| Epsom salt | 0.9 |

In addition to the base glass batch materials above, the materials set forth below were present in the original batch(es) for the Examples (compound amounts given in wt. %). It is noted that Examples 1–8 are according to different example embodiments of this invention, while CA, CB and CC are Comparative Examples provided for purposes of comparison with Examples 1–8. In particular, Comparative Example A (CA) should be compared to Examples 1–3 of this invention since they all have the same amount of total iron, while Comparative Example B (CB) should be compared to Examples 4–5 of this invention since they all have the same total iron amount, and Comparative Example C(CC) should be compared to Examples 6–8 of this invention since they all have the same amount of total iron.

BATCH MATERIALS IN EXAMPLES 1–8 (IN ADDITION TO BASE BATCH)

| Compound | CA | Ex. 1 | Ex. 2 | Ex. 3 | CB | Ex. 4 | Ex. 5 | CC | Ex. 6 | Ex. 7 | Ex. 8 |
| --- | --- | --- | --- | --- | --- | --- | --- | --- | --- | --- | --- |
| $Fe_2O_3$: | 0.102 | 0.102 | 0.102 | 0.102 | 0.09 | 0.09 | 0.09 | 0.033 | 0.033 | 0.033 | 0.033 |
| $Er_2O_3$: | 0 | 0.06 | 0.08 | 0.11 | 0 | 0.086 | 0.08 | 0 | 0 | 0.10 | 0.09 |

-continued

| BATCH MATERIALS IN EXAMPLES 1–8 (IN ADDITION TO BASE BATCH) | | | | | | | | | | | |
|---|---|---|---|---|---|---|---|---|---|---|---|
| Compound | CA | Ex. 1 | Ex. 2 | Ex. 3 | CB | Ex. 4 | Ex. 5 | CC | Ex. 6 | Ex. 7 | Ex. 8 |
| $CeO_2$: | 0 | 0.035 | 0.035 | 0.035 | 0 | 0.066 | 0.06 | 0 | 0.08 | 0.10 | 0.09 |
| $Nd_2O_3$: | 0 | 0 | 0 | 0 | 0 | 0 | 0 | 0.02 | 0.02 | 0.03 | 0.025 |

The batches were melted and glass formed using known techniques. Solar characteristics for the resulting Example glasses were as follows in the table below, with the below measurements taken after the melt and formation of the glass. It is noted that Lta (visible transmission %), UV transmission %, and % TS were measured using Ill. C, 2 degree observer, while transmissive L*, a* and b* color coordinates (CIE) were measured using Ill. D65, 10 degree observer. Moreover, Dom. λ stands for dominant wavelength, and Pe stands for excitation purity. All glass samples were about 0.219 inches thick (about 5.5–5.6 mm thick).

| CHARACTERISTICS OF EXAMPLES 1–8 GLASSES | | | | | | | | | | | |
|---|---|---|---|---|---|---|---|---|---|---|---|
| Characteristic | CA | Ex. 1 | Ex. 2 | Ex. 3 | CB | Ex. 4 | Ex. 5 | CC | Ex. 6 | Ex. 7 | Ex. 8 |
| % Lta | 88.4 | 88.0 | 87.7 | 86.2 | 88.8 | 89.7 | 89.4 | 88.0 | 89.6 | 89.0 | 88.5 |
| % UV | 74.5 | 68.9 | 74.8 | 73.6 | 76.9 | 65.9 | 66.4 | 76.2 | 65.9 | 63.2 | 63.6 |
| % TS | 79.6 | 83.1 | 81.3 | 79.8 | 79.2 | 84.5 | 84.0 | 79.5 | 84.9 | 86.0 | 84.9 |
| FeO (wt. %) | .0232 | .011 | .0177 | .0191 | .0254 | .009 | .0104 | .023 | .0079 | .0042 | .0065 |
| Dom. λ (nm) | 498 | 562 | 487 | 487 | 493 | 573 | 564 | 492 | 537 | 566 | 581 |
| Pe % | 0.64 | 0.37 | 0.24 | 0.22 | 0.9 | 0.48 | 0.27 | 0.96 | 0.25 | 0.07 | 0.07 |
| L* | 95.5 | 95.2 | 95.1 | 94.4 | 95.7 | 95.8 | 95.7 | 93.6 | 95.9 | 95.6 | 95.4 |
| a* | −1.54 | −0.34 | −0.18 | −0.15 | −1.49 | −0.1 | −0.21 | −1.41 | −0.72 | 0.09 | −0.05 |
| b* | 0.24 | 0.51 | −0.12 | −0.11 | −0.15 | 0.58 | 0.39 | −0.29 | 0.47 | 0.11 | 0.14 |

It can be seen from the above that glasses according to different embodiments of this invention (Examples 1–8) have one or more of the following example advantages over the Comparative Examples (CA, CB, and CC): (i) glasses according to Examples 1–8 had more neutral color than the respective Comparative Examples CA, CB and CC (it is noted that the Comparative Examples did not include erbium or cerium); (ii) glasses according to Examples 1–8 had less FeO (i.e., less iron in the ferrous state) than the respective examples (CA, CB and CC), even though the respective Examples and Comparative Examples for comparing therewith had the same amount of total iron; and/or (iii) glasses according to Examples 1–8 had lower excitation purity (Pe) than the respective Comparative Examples CA, CB and CC. High visible transmission (Lta) was maintained in Examples 1–8.

With respect to color, it can be seen for example that Example 1 was characterized by much more neutral a* color than CA (i.e., a* was closer to zero in Example 1 than in CA); compare a*=−0.34 of Example 1 with a*=−1.54 of Comparative Example A (CA). In a similar manner, it can be seen for example that Example 4 had much more neutral a* color than CB (i.e., a* was closer to zero in Example 4 than in CB); compare a*=−0.1 of Example 4 with a*=−1.49 of Comparative Example B (CB). In a similar manner, it can be seen for example that Example 7 had much more neutral a* color than CC (i.e., a* closer to zero in Example 7 than in CC); compare a*=0.09 of Example 7 with a*=−1.41 of Comparative Example C(CC). The improved neutral color of example embodiments of this invention is a result of the unique material combinations used in glasses according to example embodiments of this invention.

It is noted that in any of Examples 1–8 above, the cerium oxide may be replaced with sodium nitrate in certain embodiments of this invention (see amounts in Tables 4–6 above). Certain examples according to other embodiments of this invention are set forth below (same base glass as above for other examples), where Examples 10–11 utilize sodium nitrate was used instead of or in addition to cerium oxide. It is noted that Examples 9–11 differed from Examples 1–8 above in that for Examples 9–11 each glass sample was only 0.161 inches thick.

| BATCH MATERIALS IN EXAMPLES 9–11 (IN ADDITION TO BASE BATCH) | | | |
|---|---|---|---|
| Compound | Ex. 9 | Ex. 10 | Ex. 11 |
| $Fe_2O_3$: | 0.054 | 0.055 | 0.048 |
| $Er_2O_3$: | 0.06 | 0 | 0 |
| $CeO_2$: | 0.06 | 0.09 | 0 |
| $NaNO_3$: | 0 | 0.5 | 0.78 |
| $Nd_2O_3$: | 0 | 0 | 0 |

The above batches were melted and glass formed using known techniques. Solar characteristics for the resulting Example glasses were as follows in the table below, with the below measurements taken after the melt and formation of the glass.

CHARACTERISTICS OF EXAMPLES 9–11 GLASSES

| Characteristic | Ex. 9 | Ex. 10 | Ex. 11 |
| --- | --- | --- | --- |
| % Lta | 90.43 | 91.32 | 90.75 |
| % UV | 71.81 | 72.63 | 77.73 |
| % TS | 87.78 | 90.54 | 88.14 |
| FeO (wt. %) | 0.0031 | 0.0007 | 0.0048 |
| Dom. λ(nm) | 578 | 570 | 566 |
| Pe % | 0.63 | 0.41 | 0.53 |
| L* | 96.11 | 96.52 | 96.29 |
| a* | 0.09 | −0.18 | −0.36 |
| b* | 0.67 | 0.5 | 0.67 |

As with the previous examples, it can be seen that Examples 9–11 have improved color (more neutral) and high visible transmission relative to the comparative examples, albeit reduced thickness. It is noted that Examples 9–11 utilized a smaller amount of total iron than Examples 1–8.

Examples 9–11 illustrate that according to certain example embodiments of this invention, the glass may even have a visible transmission of at least 90% when at a reference thickness of about 0.161 inches.

EXAMPLES 12–21

The following approximate base glass batch was used for Examples 12–21 herein (note: the below-listed ingredients in the batch will add up to 100% by weight once oxides thereof are accounted for; thus, they need not add up to one hundred as raw materials):

| Batch Ingredient for Base Glass | Parts by Wt. |
| --- | --- |
| sand | 72.5 |
| soda ash | 22.5 |
| dolomite | 19.5 |
| limestone | 4.3 |
| carbon | 0.73 |
| salt cake | 0.05 |

Following the melt, the resulting glasses of Examples 12–21 were characterized by the following approximate base glass composition:

| Ingredient | Wt. % |
| --- | --- |
| $SiO_2$ | 73.1% |
| $Na_2O$ | 13.67% |
| CaO | 8.64% |
| MgO | 4.12% |
| $Al_2O_3$ | 0.12% |
| $K_2O$ | 0.04% |
| $TiO_2$ | 0.01% |
| $SO_3$ | 0.21% |

In addition to the base glass batch materials above, the materials set forth below were also present in the glasses for the below-listed Examples. The glasses of Examples 12–19 and 21 were substantially free of cerium oxide (i.e., no more than 2 ppm, more preferably no greater than 1 ppm). Moreover, the glasses of Examples 12–19 and 21 were also substantially free of cobalt oxide (i.e., no more than 2 ppm, more preferably no more than 1 ppm).

COLORANTS IN EXAMPLES 12–20 (IN ADDITION TO BASE MATERIAL)

| | Ex. → | | | | | | | | |
| --- | --- | --- | --- | --- | --- | --- | --- | --- | --- |
| | 12 | 13 | 14 | 15 | 16 | 17 | 18 | 19 | 20 |
| % FeO: | 0.0083 | 0.0086 | 0.0077 | 0.0081 | 0.0085 | 0.0088 | 0.0082 | 0.0084 | 0.0062 |
| $Er_2O_3$: | 0.07 | 0.08 | 0.09 | 0.09 | 0.05 | 0.05 | 0.05 | 0.04 | 0.045 |
| $CeO_2$: | 0 | 0 | 0 | 0 | 0 | 0 | 0 | 0 | 0.06 |
| $Co_3O_4$: | 0 | 0 | 0 | 0 | 0 | 0 | 0 | 0 | 0.00004 |
| $Fe_2O_3$: | each of Examples 12–20 had a total iron content of from 0.052 to 0.064 | | | | | | | | |

It is noted that the total iron content (expressed as $Fe_2O_3$) varied slightly between 0.052 and 0.064% due to the impurity variations in the raw materials used such as sand, dolomite and limestone. Moreover, the glasses of each of Examples 12–20 had a redox value of from 0.11 to 0.18 in this regard. Solar characteristics for the glasses for Examples 12–20 when in 5.6 mm thick glass were as follows in the table below, with the below measurements taken after the melt and formation of the glass.

CHARACTERISTICS OF EXAMPLES 12–20 (at 5.6 mm thick)

| | Ex. → | | | | | | | | |
| --- | --- | --- | --- | --- | --- | --- | --- | --- | --- |
| | 12 | 13 | 14 | 15 | 16 | 17 | 18 | 19 | 20 |
| % Lta | 90.7 | 90.5 | 90.5 | 90.5 | 90.6 | 90.6 | 90.7 | 90.7 | 90.6 |
| % T1000 | 83.8 | 83.3 | 84.4 | 84.0 | 84.0 | 83.4 | 84.0 | 83.5 | 85.9 |
| a* | −0.17 | −0.12 | 0.02 | 0.08 | −0.29 | −0.31 | −0.32 | −0.4 | −0.25 |
| b* | 0.1 | 0.09 | 0.1 | 0.12 | 0.2 | 0.18 | 0.18 | 0.27 | 0.23 |

Moreover, the characteristics of the glasses of these examples at other thicknesses are set forth below (thickness in mm):

CHARACTERISTICS OF EXAMPLES 12–20 (at other thicknesses)

| | Ex. → | | | | | | | | |
|---|---|---|---|---|---|---|---|---|---|
| | 12 | 13 | 14 | 15 | 16 | 17 | 18 | 19 | 20 |
| % Lta | 89.7 | 89.5 | 89.7 | 87.9 | 90.5 | 89.8 | 89.7 | 89.7 | 90.1 |
| % T1000 | 79.6 | 78.8 | 81.5 | 79.0 | 82.6 | 79.6 | 81.7 | 78.9 | 83.7 |
| a* | −0.27 | −0.2 | 0.02 | 0.12 | −0.35 | −0.47 | −0.63 | −0.65 | −0.35 |
| b* | 0.17 | 0.15 | 0.15 | 0.36 | 0.22 | 0.27 | 0.3 | 0.4 | 0.32 |
| thick: | 8.7 | 8.7 | 7.9 | 9.4 | 6.6 | 8.3 | 11.2 | 9.0 | 8.0 |

It can be seen from the above that glasses according to certain example embodiments of this invention have more neutral color than the Comparative Examples (CA, CB, and CC) discussed above. The improved neutral color of example embodiments of this invention is a result of the unique material combinations used in glasses according to example embodiments of this invention.

For example 21, in addition to the base glass batch materials above, the materials set forth below were also present in the glass for this Example.

COLORANTS IN EXAMPLE 21
(IN ADDITION TO BASE MATERIAL)

| Example: → | 21 |
|---|---|
| % FeO: | 0.0082 |
| $Er_2O_3$: | 0.04 |
| $Fe_2O_3$ (toal iron): | 0.054 |
| Glass redox: | 0.15 |

Solar characteristics for the glass of Example 21 were as follows, with the below measurements taken after the melt and formation of the glass.

CHARACTERISTICS OF EXAMPLE 21

| | Example: | |
|---|---|---|
| | 21 (@ 2 mm) | 21 (@ 6 mm) |
| % Ltc(Y): | 91.4 | 90.5 |
| L* | 96.8 | 96.4 |
| a* | −0.1 | −0.31 |
| b* | 0.1 | 0.31 |

It can be seen from the above that glasses according to Example 21 have more neutral color than the Comparative Examples (CA, CB, and CC) discussed above. The improved neutral color of example embodiments of this invention is a result of the unique material combinations used in glasses according to example embodiments of this invention.

The terms, and characteristics, of ultraviolet light transmittance (% UV), dominant wavelength, and excitation purity (i.e. % "purity", or Pe) are well understood terms in the art, as are their measurement techniques. Such terms are used herein, in accordance with their well known meaning, e.g., see U.S. Pat. No. 5,308,805. In particular, ultraviolet transmittance (% UV) is measured herein using Parry Moon Air Mass=2 (300–400 nm inclusive, integrated using Simpson's Rule at 10 nm intervals). Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

Once given the above disclosure many other features, modifications and improvements will become apparent to the skilled artisan. Such features, modifications and improvements are therefore considered to be a part of this invention, the scope of which is to be determined by the following claims:

What is claimed is:

1. Glass comprising:

| Ingredient | wt. % |
|---|---|
| $SiO_2$ | 67–75% |
| $Na_2O$ | 10–20% |
| CaO | 5–15% |
| total iron (expressed as $Fe_2O_3$) | 0.01 to 0.30% |
| erbium oxide | 0.01 to 0.30% | wherein the glass has visible transmission of at least 75%, and at least one of a transmissive a* color value of −1.0 to +1.0 and a transmissive b* color value of −1.0 to +1.5, and wherein the glass comprises 0–0.0002% cerium oxide.

2. The glass of claim 1, wherein the glass comprises:

| total iron (expressed as $Fe_2O_3$) | 0.02 to 0.20% |
|---|---|
| erbium oxide | 0.02 to 0.20%. |

3. The glass of claim 2, wherein the glass comprises:

| total iron (expressed as $Fe_2O_3$) | 0.03 to 0.15% |
|---|---|
| erbium oxide | 0.03 to 0.13%. |

4. The glass of claim 1, wherein the glass has a visible transmission of at least 85% at a reference thickness of about 5.6 mm.

5. The glass of claim 1, wherein the glass has a visible transmission of at least 90% at a reference thickness of about 5.6 mm.

6. The glass of claim 1, wherein the glass has a redox value ($FeO/Fe_2O_3$) no greater than 0.20.

7. The glass of claim 1, wherein the glass has a redox value ($FeO/Fe_2O_3$) no greater than 0.15.

8. The glass of claim 1, wherein the glass has a redox value ($FeO/Fe_2O_3$) no greater than 0.13.

9. The glass of claim 1, wherein the glass further comprises less than or equal to 0.020% FeO.

10. The glass of claim 1, wherein the glass comprises from 0.0015 to 0.015% FeO.

11. The glass of claim 1, wherein the glass comprises from 0.0015 to 0.012% FeO.

12. The glass of claim 1, wherein the glass comprises less than or equal to 0.0002% cobalt oxide.

13. The glass of claim 1, wherein the glass comprises less than or equal to 0.0001% cobalt oxide.

14. The glass of claim 1, wherein the glass comprises less than or equal to 0.0001% cerium oxide.

15. Glass comprising:

| Ingredient | wt. % |
| --- | --- |
| $SiO_2$ | 67–75% |
| $Na_2O$ | 10–20% |
| CaO | 5–15% |
| total iron (expressed as $Fe_2O_3$) | 0.01 to 0.30% |
| erbium oxide | 0.01 to 0.30% | wherein the glass has visible transmission of at least 75%, and at least one of a transmissive a* color value of –1.0 to +1.0 and a transmissive b* color value of –1.0 to +1.5, and wherein the glass comprises 0–0.12% cerium oxide.

16. Glass comprising:

| Ingredient | wt. % |
| --- | --- |
| $SiO_2$ | 67–75% |
| $Na_2O$ | 10–20% |
| CaO | 5–15% |
| total iron (expressed as $Fe_2O_3$) | 0.01 to 0.30% |
| erbium oxide | 0.01 to 0.30% | wherein the glass has visible transmission of at least 75%, and at least one of a transmissive a* color value of –1.0 to +1.0 and a transmissive b* color value of –1.0 to +1.5, and wherein the glass is substantially free of both cerium oxide and cobalt oxide.

17. The glass of claim 1, wherein the glass includes less than 2 ppm of Se.

18. The glass of claim 1, wherein the glass includes less than 1 ppm of Se.

19. The glass of claim 1, wherein the glass comprises from 0.02 to 0.13% erbium oxide.

20. The glass of claim 1, wherein the glass has a transmissive a* color value of –1.0 to +1.0 and a transmissive b* color value of –0.7 to +1.0.

21. The glass of claim 1, wherein the glass has a transmissive a* color value of –0.60 to +0.60 and a transmissive b* color value of –0.7 to +1.0.

22. The glass of claim 1, wherein the glass comprises from 0–5% MgO, from 0–5% $K_2O$ and from 0–5% $Al_2O_3$.

23. The glass of claim 1, wherein the glass comprises from 6–12% CaO and from 10–15% $Na_2O$.

24. A glass comprising a base portion and a colorant portion, wherein the base portion of the glass comprises:

| Ingredient | wt. % |
| --- | --- |
| $SiO_2$ | 67–75% |
| $Na_2O$ | 10–20% |
| CaO | 5–15% | wherein the colorant portion of the glass consists essentially of:

| | |
| --- | --- |
| total iron (expressed as $Fe_2O_3$) | 0.01 to 0.30% |
| erbium oxide | 0.01 to 0.30% | wherein the glass has visible transmission of at least 75%, a transmissive a* color value of –1.0 to +1.0 and a transmissive b* color value of –1.0 to +1.5, and wherein the glass comprises 0–0.12% cerium oxide.

25. The glass of claim 24, wherein the colorant portion consists essentially of:

| | |
| --- | --- |
| total iron (expressed as $Fe_2O_3$) | 0.02 to 0.20% |
| erbium oxide | 0.02 to 0.20%. |

26. The glass of claim 24, wherein the colorant portion consists essentially of:

| | |
| --- | --- |
| total iron (expressed as $Fe_2O_3$) | 0.03 to 0.15% |
| erbium oxide | 0.03 to 0.13%. |

27. The glass of claim 24, wherein the glass has a visible transmission of at least 85% at a reference thickness of about 5.6 mm.

28. The glass of claim 24, wherein the glass has a visible transmission of at least 90% at a reference thickness of about 5.6 mm.

29. The glass of claim 24, wherein the glass has a redox value ($FeO/Fe_2O_3$) no greater than 0.20.

30. A high transmittance glass comprising:

| | |
| --- | --- |
| $SiO_2$ | 67–75% |
| $Na_2O$ | 10–20% |
| CaO | 5–15% |
| total iron (expressed as $Fe_2O_3$) | 0.01 to 0.30% |
| erbium oxide | 0.01 to 0.30% | wherein the glass has visible transmission of at least 88% at a references thickness of 5.6 mm, a transmissive a* color value of –1.0 to +1.0 and a transmissive b* color value of –1.0 to +1.5, and wherein the glass comprises 0–0.12% cerium oxide.

31. The glass of claim 30, wherein the glass comprises:

| | |
| --- | --- |
| total iron (expressed as $Fe_2O_3$) | 0.02 to 0.20% |
| erbium oxide | 0.02 to 0.20%. |

32. The glass of claim 30, wherein the glass comprises:

| | |
| --- | --- |
| total iron (expressed as $Fe_2O_3$) | 0.03 to 0.15% |
| erbium oxide | 0.03 to 0.13%. |

33. The glass of claim 30, wherein the glass has a visible transmission of at least 90% at a reference thickness of 5.6 mm.

34. The glass of claim 30, wherein the glass has a visible transmission of at least 90.5% at a reference thickness of 5.6 mm.

35. The glass of claim 30, wherein the glass has a redox value ($FeO/Fe_2O_3$) no greater than 0.20.

36. The glass of claim 30, wherein the glass has a redox value ($FeO/Fe_2O_3$) of from 0.10 to 0.20.

37. The glass of claim 30, wherein the glass is a soda-lime-silica based glass.

* * * * *